United States Patent
Tseng et al.

(10) Patent No.: US 10,601,032 B2
(45) Date of Patent: Mar. 24, 2020

(54) COMPOSITE ELECTRODE MATERIAL

(71) Applicant: National Chiao Tung University, Hsinchu (TW)

(72) Inventors: Tseung-Yuen Tseng, Hsinchu (TW); Chih-Chieh Yang, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 392 days.

(21) Appl. No.: 15/284,554

(22) Filed: Oct. 4, 2016

(65) Prior Publication Data

US 2017/0317341 A1  Nov. 2, 2017

(30) Foreign Application Priority Data

Apr. 28, 2016  (TW) .............................. 105113269 A

(51) Int. Cl.
| | |
|---|---|
| *H01M 4/36* | (2006.01) |
| *H01M 4/62* | (2006.01) |
| *H01G 11/24* | (2013.01) |
| *H01G 11/32* | (2013.01) |
| *H01G 11/26* | (2013.01) |
| *H01G 11/58* | (2013.01) |

(Continued)

(52) U.S. Cl.
CPC .............. *H01M 4/366* (2013.01); *C25D 5/18* (2013.01); *C25D 13/00* (2013.01); *C25D 15/00* (2013.01); *H01G 9/0029* (2013.01); *H01G 9/042* (2013.01); *H01G 11/24* (2013.01); *H01G 11/26* (2013.01); *H01G 11/32* (2013.01); *H01G 11/36* (2013.01); *H01G 11/58* (2013.01); *H01G 11/86* (2013.01); *H01M 4/0452* (2013.01); *H01M 4/0457* (2013.01); *H01M 4/624* (2013.01); *C25D 3/562* (2013.01); *H01M 4/525* (2013.01); *H01M 4/625* (2013.01)

(58) Field of Classification Search
None
See application file for complete search history.

(56) References Cited

U.S. PATENT DOCUMENTS

| | | | | |
|---|---|---|---|---|
| 8,709,654 | B2 * | 4/2014 | Takeuchi | ................ C23C 26/00 429/218.1 |
| 2012/0328921 | A1 * | 12/2012 | Kawaoka | .............. H01M 4/665 429/94 |
| 2014/0230868 | A1 | 8/2014 | Ryu et al. | |

FOREIGN PATENT DOCUMENTS

| | | |
|---|---|---|
| CN | 101944396 | 1/2011 |
| CN | 103219162 | 7/2013 |

(Continued)

OTHER PUBLICATIONS

Jie Xu, et al., "Facile preparation of NiCo2O4 nanobelt/graphene composite for electrochemical capacitor application," Electrochimica Acta 166, Jun. 2015, pp. 206-214.

(Continued)

*Primary Examiner* — Helen Oi K Conley
(74) *Attorney, Agent, or Firm* — JCIPRNET

(57) ABSTRACT

Provided is a composite electrode material. The composite electrode material is disposed on a surface of an electrode. The composite electrode material includes a plurality of conductive material layers and a plurality of active material layers. The conductive material layers and the active material layers are alternately stacked along a direction non-parallel to the surface of the electrode, and are arranged disorderly along a direction parallel to the surface of the electrode.

9 Claims, 3 Drawing Sheets

(51) Int. Cl.
  *C25D 15/00* (2006.01)
  *C25D 5/18* (2006.01)
  *C25D 13/00* (2006.01)
  *H01G 9/00* (2006.01)
  *H01G 9/042* (2006.01)
  *H01G 11/36* (2013.01)
  *H01G 11/86* (2013.01)
  *H01M 4/04* (2006.01)
  *H01M 4/525* (2010.01)
  *C25D 3/56* (2006.01)

(56) References Cited

FOREIGN PATENT DOCUMENTS

| TW | I504891 | 10/2015 |
|---|---|---|
| TW | I508356 | 11/2015 |
| TW | I508357 | 11/2015 |
| TW | I509112 | 11/2015 |
| TW | I509865 | 11/2015 |
| TW | I509867 | 11/2015 |
| TW | I511358 | 12/2015 |
| TW | I511359 | 12/2015 |
| TW | I513861 | 12/2015 |

OTHER PUBLICATIONS

Ediga Umeshbabu, et al., "Effect of solvents on the morphology of NiCo2O4/graphene nanostructures for electrochemical pseudocapacitor application," J Solid State Electrochem, Sep. 2015, pp. 1-8.

Ediga Umeshbabu, et al., "Synthesis of mesoporous NiCo2O4—rGO by a solvothermal method for charge storage applications," RSC Advances, vol. 5, Jul. 2015, pp. 66657-66666.

Delong Li, et al., "Facile Synthesis of Carbon Nanosphere/NiCo2O4 Coreshell Sub-microspheres for High Performance Supercapacitor," Scientific Reports, 5:12903, Aug. 2015, pp. 1-8.

Van Hoa Nguyen, et al., "Three-dimensional nickel foam/graphene/NiCo2O4 as high-performance electrodes for supercapacitors," Journal of Power Sources, vol. 273, Jan. 2015, pp. 110-117.

Juan Yang, et al., "Ultrafast Self-Assembly of Graphene Oxide-Induced Monolithic NiCo—Carbonate Hydroxide Nanowire Architectures with a Superior Volumetric Capacitance for Supercapacitors," Advanced Functional Materials, vol. 25, Feb. 2015, pp. 2109-2116.

* cited by examiner

COMPOSITE ELECTRODE MATERIAL

CROSS-REFERENCE TO RELATED APPLICATION

This application claims the priority benefit of Taiwan application serial no. 105113269, filed on Apr. 28, 2016. The entirety of the above-mentioned patent application is hereby incorporated by reference herein and made a part of this specification.

BACKGROUND OF THE INVENTION

Field of Invention

The present invention relates to an electrode material, and more particularly to a composite electrode material.

Description of Related Art

An energy storage technique usually indicates a storage of electric energy, mainly including an energy storage with physical properties (e.g., a capacitor), an energy storage with electrochemical properties (e.g., a battery) or a combination thereof (e.g., a supercapacitor).

Generally speaking, an electrode material of the energy storage device is usually manufactured with a slurry coating, a chemical vapour deposition, a DC electroplating or a DC electrophoresis. However, the above method requires a mixing or a stage-by-stage approach to prepare the electrode material. Such method is time-consuming and the electrode material cannot be sufficiently mixed. Therefore, poor contact exists between the components of the electrode material, such that the electrochemical properties of the energy storage device decrease (e.g., a low specific capacitance) and a rapid decline in specific capacitance at a high-speed charging/discharging are observed.

SUMMARY OF THE INVENTION

The present invention provides a composite electrode material. The composite electrode material has a high specific capacitance, and such high specific capacitance can be maintained at a high-speed charging/discharging.

The present invention provides a composite electrode material which is disposed on a surface of an electrode and includes a plurality of conductive material layers and a plurality of active material layers. The conductive material layers and the active material layers are stacked alternately along a direction non-parallel to the surface of the electrode, and are arranged disorderly along a direction parallel to the surface of the electrode.

The present invention further provides a composite electrode material which is disposed on a surface of an electrode and includes a plurality of first stacked structures and a plurality of second stacked structures. The first stacked structures and the second stacked structures are disposed on the surface of the electrode. Each of the first stacked structures has at least one first conductive material layer and at least one first active material layer, and the first conductive material layer is in contact with the surface of the electrode. Each of the second stacked structures has at least one second conductive material layer and at least one second active material layer, and the second active material layer is in contact with the surface of the electrode. The first stacked structures and the second stacked structures are arranged disorderly along a direction parallel to the surface of the electrode.

In view of the above, in the present embodiment, a composite electrode material is formed on the surface of an auxiliary electrode by applying an alternating voltage to an electro-deposition device. The conductive material layers and the active material layers of the composite electrode material are stacked alternately along the direction non-parallel to the surface of the electrode, and are arranged disorderly along the direction parallel to the surface of the electrode. By such manner, the bonding properties between the conductive material layers and the active material layers can be improved, and the conductive material layers and the active material layers can be sufficiently mixed. Accordingly, the energy storage device including the composite electrode material of the present embodiment can maintain a high specific capacitance at a high current density charging/discharging. That is, the energy storage device including the composite electrode material of the present embodiment can significantly reduce the charging time so as to meet the users' requirements.

Besides, in the manufacturing method of the present embodiment, a stacked composite electrode material can be formed merely with a one-step method. Therefore, the performance of simplifying the process and reducing the cost can be easily achieved with the manufacturing method of the present embodiment.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
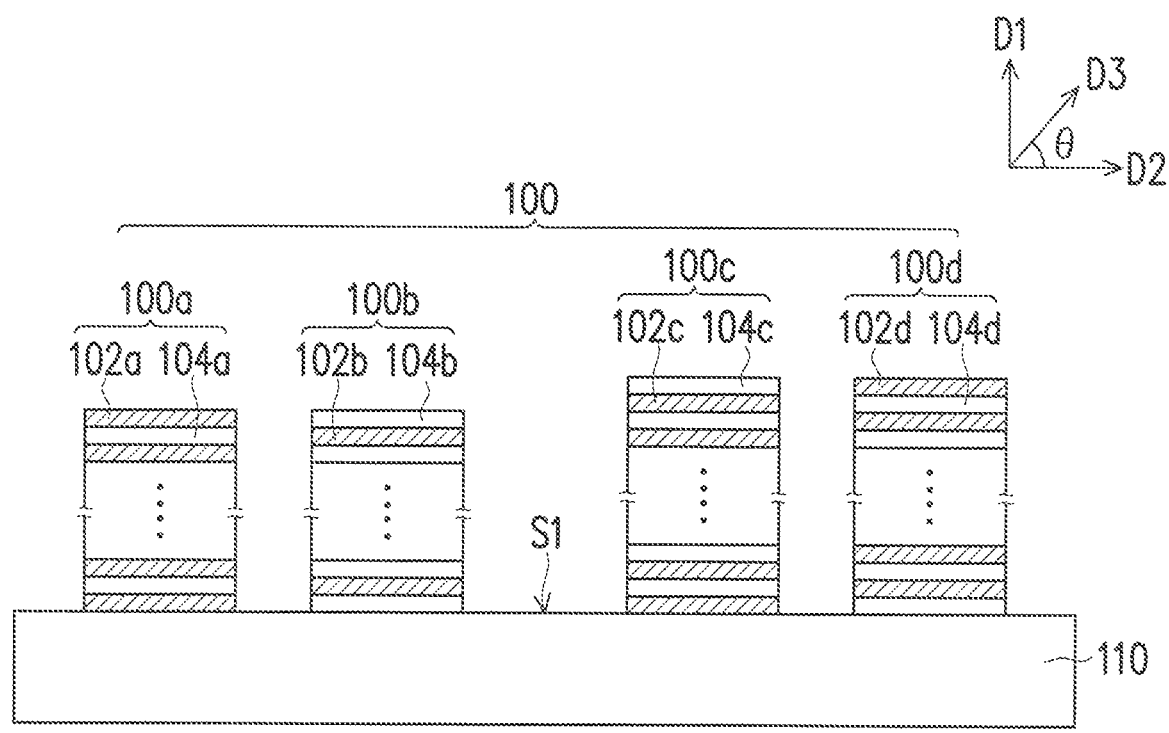
FIG. 1 is a schematic cross-sectional view of a composite electrode material according to an embodiment of the present invention.

The present invention will now be described more fully with reference to the accompanying drawings, in which exemplary embodiments of the invention are shown. The invention may, however, be embodied in other forms and should not be construed as being limited to the embodiments set forth herein. In the following embodiments, the directional terminology, such as "top," "bottom," or the like, is used with reference to the orientation of the Figure(s) being described. As such, the directional terminology is used for purposes of illustration and is in no way limiting. Besides, the dimensions or thicknesses of layers and regions are exaggerated for clarity. Wherever possible, the same or like reference numbers are used in the drawings and the description to refer to the same or like parts.

FIG. 1 is a schematic cross-sectional view of a composite electrode material according to an embodiment of the present invention.

Referring to FIG. 1, the present embodiment provides a composite electrode material 100 disposed on a surface S1 of an electrode 110. In an embodiment, the electrode 110 includes a conductive material, such as platinum (Pt) or another metal material, but the present invention is not limited thereto. Besides, the type of the electrode 110 is not limited by the present invention. For example, the electrode 110 can be an electrode plate or a porous/foam electrode or another type of the electrode.

Specifically, the composite electrode material 100 includes a plurality of stacked structures 100a, 100b, 100c and 100d. For example, the stacked structure 100a has N+1 conductive material layers 102a and N active material layers 104a, wherein N is an integer equal to or greater than 1. As shown in FIG. 1, one active material layer 104a is located between two adjacent conductive material layers 102a, and the lowest first conductive material layer 102a is in contact with the surface S1 of the electrode 110.

The stacked structure 100b has i+1 active material layers 104b and i conductive material layers 102b, wherein i is an integer equal to or greater than 1. As shown in FIG. 1, one conductive material layer 102b is located between two adjacent active material layers 104b, and the lowest active material layer 104b is in contact with the surface S1 of the electrode 110.

The stacked structure 100c has N conductive material layers 102c and N active material layers 104c, wherein N is an integer equal to or greater than 1. As shown in FIG. 1, the conductive material layers 102c and the active material layers 104c are stacked alternately along the direction D1 perpendicular to the surface S1 of the electrode 110, and the lowest conductive material layer 102c is in contact with the surface S1 of the electrode 110.

The stacked structure 100d has i conductive material layers 102d and i active material layers 104d, wherein i is an integer equal to or greater than 1. As shown in FIG. 1, the conductive material layers 102d and the active material layers 104d are stacked alternately along the direction D1 perpendicular to the surface S1 of the electrode 110, and the lowest active material layer 104d is in contact with the surface S1 of the electrode 110.

It is noted that, the embodiment of FIG. 1 in which only four stacked structures are shown and the conductive material layers and the active material layers are stacked alternately along the direction perpendicular to the surface of the electrode is provided for illustration purposes, and is not construed as limiting the present invention. In another embodiment, the number of the stacked structures can be one, two, three or more than four. Stacked structures are contemplated as falling within the scope of the invention as long as the conductive material layers and the active material layers of such stacked structures are stacked alternately along the direction D1 or D3 non-parallel to the surface S1 of the electrode 110, and are arranged disorderly along the direction D2 parallel to the surface S1 of the electrode 110. Herein, the direction D1/D3 non-parallel to the surface S1 of the electrode 110 can be the direction D1 perpendicular to the surface of the electrode or the direction D3 which forms an included angle θ (θ is not zero) with the direction D2 parallel to the surface S1 of the electrode 110. In other words, a direction is contemplated as falling within the scope of the invention as long as such direction is not the direction D2 that is parallel to the surface S1 of the electrode 110. The term "arranged disorderly" indicates that multiple stacked structures can be arranged in a staggered or random manner. In other words, the conductive material layers and the active material layers of the present embodiment can be sufficiently mixed, so as to increase the contact areas between the conductive material layers and the active material layers. Therefore, during the charging/discharging operation, the electrons generated from the active material layers can be quickly transmitted by the conductive material layers, so as to improve the charging/discharging efficiency. On the other hand, as compared to the conventional single active material layer, multiple active material layers of the present embodiment can provide a greater effective reaction area. That is, in the present embodiment, the effective reaction area between the active material layers and the electrolyte solution of the energy storage device is increased, so the specific capacitance of the energy storage device is accordingly improved.

Besides, the stacked structures 100a, 100b, 100c and 100d in FIG. 1 are not in contact with each other and are separated by a distance. However, the present invention is not limited thereto. In another embodiment, the sidewalls of the stacked structures 100a, 100b, 100c and 100d are in contact with each other, or the sidewalls of only parts of the stacked structures 100a, 100b, 100c and 100d are in contact with each other.

In an embodiment, the material of each of the conductive material layers 102a-102d includes a conductive material such as graphene, a graphene derivative, nanotubes, a monomer for a conductive polymer, or a combination thereof. The graphene derivative can be a doped graphene, an undoped graphene, a doped graphene oxide, an undoped graphene oxide, or a combination thereof. The monomer for the conductive polymer can be aniline. Each of the conductive material layers 102a-102d has a thickness of about 0.3 nm to 10 μm.

In an embodiment, the material of each of the active material layers 104a-104d can be a positive active material or a negative active material. That is, the composite electrode material 100 of the present embodiment can be applied to a positive electrode or a negative electrode depending on the materials or species of the active material layers. For example, the material of each of the active material layers 104a-104d can be a metal oxide, a metal hydroxide, a metal oxysulfide, a metal sulfide, a metal fluoride, a metal or a combination thereof. Each of the active material layers 104a-104d has a thickness of about 0.3 nm to 10 μm.

The manufacturing method of the composite electrode material 100 of the above embodiment is described in the following. The manufacturing method of the present invention is illustrated below with reference to the electro-deposition device and the cross-sectional view of the composite electrode material 100.

Figure 2:
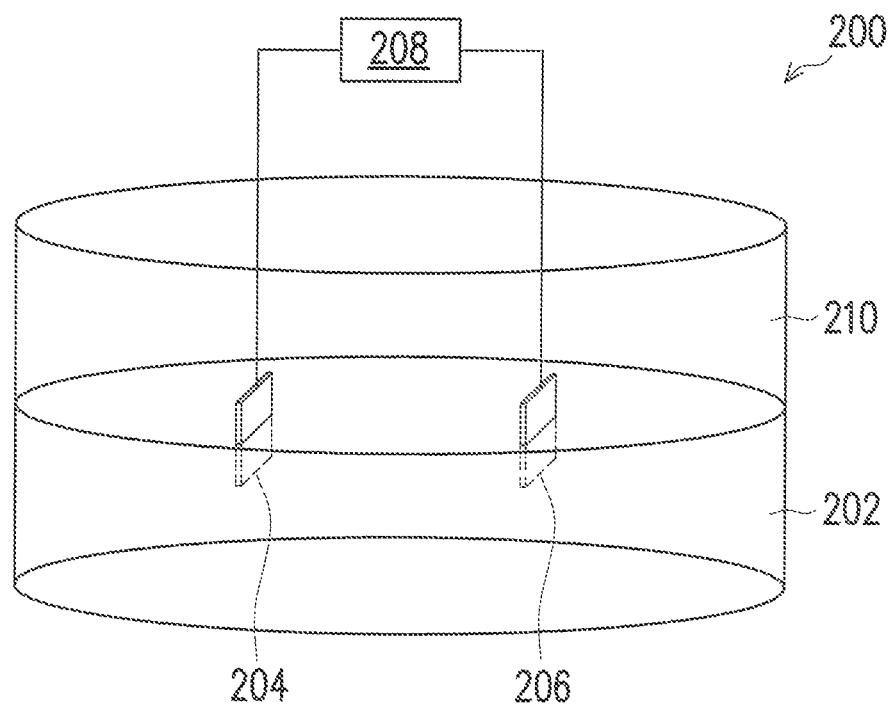
FIG. 2 is a schematic view of an electro-deposition device according to an embodiment of the present invention.

FIG. 2 is a schematic view of an electro-deposition device according to an embodiment of the present invention.

Referring to FIG. 2, the present embodiment provides a method of manufacturing a composite electrode material by an electro-deposition device which includes the following steps. First, an electro-deposition device 200 is provided. Specifically, the electro-deposition device 200 includes a reaction device 210, a working electrode 204, an auxiliary electrode 206 and a power supply 208.

Thereafter, a mixed solution 202 is placed in the reaction device 210. In an embodiment, the reaction device 210 can be a beaker, a culture dish or a suitable vessel which is adapted for containing the mixed solution 202 without chemically reacting with the mixed solution 202.

Specifically, the mixed solution 202 includes a conductive material precursor and an active material precursor. In an embodiment, the conductive material precursor includes a conductive material such as graphene, a graphene derivative, nanotubes, a monomer for a conductive polymer, or a combination thereof. The graphene derivative can be a doped graphene, an undoped graphene, a doped graphene oxide, an undoped graphene oxide or a combination thereof. The monomer for the conductive polymer can be aniline. The active material precursor can be a metal salt, and the metal salt includes a metal nitride, a metal acetate, a metal sulfate, or a combination thereof.

Afterwards, the working electrode 204 and the auxiliary electrode 206 are dipped in the mixed solution 202, and one terminal of the power supply 208 is electrically connected to the working electrode 204 and another terminal of the power supply 208 is electrically connected to the auxiliary electrode 206. In an embodiment, the working electrode 204 and the auxiliary electrode 206 can be platinum electrodes which are not easily eroded or consumed by chemically reacting with the mixed solution 202. In another embodiment, the electro-deposition device 200 can further include a reference electrode.

An alternating voltage is then applied to the auxiliary electrode 206 by the power supply 208, such that a plurality of electrochemical reactions are carried out on the surface of the auxiliary electrode 206, and the composite electrode material 100 of FIG. 1 is thus formed. In an embodiment, the composite electrode material 100 has a specific capacitance of about 2,000 F/g to 3,000 F/g. At a high current density (e.g., 10 A/g) charging/discharging, the composite electrode material 100 still has a specific capacitance of about 2,000 F/g to 3,000 F/g. In an embodiment, each of the electrochemical reactions can be an oxidation-reduction reaction, an electrophoretic deposition or a combination thereof.

Specifically, the electro-deposition device 200 of the present embodiment is constantly switched between a high voltage mode and a low voltage mode. The conductive material precursor in the mixed solution 202 is transformed into conductive material layers in the high voltage mode, while the active material precursor in the mixed solution 202 is transformed into active material layers in the low voltage mode. Since the manufacturing method is a deposition technique at an atomic scale, the conductive material layers and the active material layers can be uniformly stacked by multiple switching between high and low voltages. The conventional technique such as a precipitation method or a slurry method has the issue that materials per se are aggregated without contacting the electrode, so the performance of the energy storage device is degraded. The present embodiment accordingly provides a method to solve the above conventional issue.

In an embodiment, the alternating voltage can be a pulse voltage, an AC voltage (e.g., a sine-wave AC voltage) or a cycle voltage. However, the present invention is not limited thereto. In another embodiment, an operation is contemplated as falling within the scope of the present invention as long as such operation includes continuously switching between high and low voltages applied to the auxiliary electrode 206. In another embodiment, the high voltage can be a positive voltage, and the low voltage can be a negative voltage.

In addition, in the present embodiment, the thickness of each of the conductive material layers and the active material layers can be adjusted by changing the pulse period. That is, when the pulse period is decreased, the oxidation-reduction reaction is carried out for a shorter time, and each of the conductive material layers and the active material layers is accordingly formed thinner. Besides, in the present embodiment, the number of the stacked layers can be controlled by changing the total electro-deposition time. That is, when the total electro-deposition time is increased, the total number of the conductive material layers and the active material layers is accordingly increased.

Besides, an alternating voltage can be applied to a roll-to-roll electroplating device, in addition to the electro-deposition device 200, so as to form a composite electrode material. The roll-to-roll electroplating device can be used for mass production with a reduced process cost, and thus, the competitive advantage can be easily achieved.

In order to prove the feasibility of the present invention, several experiments are provided below to further illustrate the composite electrode material of the present invention. Experiments are provided below to more specifically describe the invention. Although the following experiments are described, the materials used and the amount and ratio of each thereof, as well as handling details and handling procedures, etc., can be suitably modified without exceeding the scope of the invention. Accordingly, restrictive interpretation should not be made to the invention based on the experiments described below.

Example 1

First, a graphene oxide was prepared through a Hummer's method. Specifically, 720 mL of $H_2SO_4$ and 80 mL of $H_3PO_4$ were uniformly mixed. Thereafter, 3 g of graphene and 12 g of $KMnO_4$ were added to the mixture, the reaction temperature was increased to 60° C. and the mixture was reacted for 18 hours. Afterwards, 600 mL of ice cubes (prepared by deionized water) and 5-10 mL of $H_2O_2$ were added to the mixture to stop the reaction. The mixture was then washed several times with deionized water, hydrochloric acid and ethanol, filtered by a glass fiber filter, and finally centrifuged. Next, ether was added to the mixture, filtered by a polytetrafluoroethylene (PTFE) filter with a pore size of 0.2 μm, and finally vacuum baked at 40° C. for 12 hours, and a solid graphene oxide was thus obtained.

Afterwards, 2 mM of $Ni(NO_3)_2$ and 4 mM of $Co(NO_3)_2$ were prepared in a 0.01 M phosphate buffered saline (PBS, pH=7.4) solution, and a graphene oxide PBS solution in which the graphene oxide had a weight equal to the total weight of $Ni(NO_3)_2$ and $Co(NO_3)_2$ was added thereto, and the mixture was fully stirred. A potentiostat (CH Instruments, CHI 608) with a foam nickel as a working electrode, a standard calomel electrode as a reference electrode and a platinum electrode as an auxiliary electrode was used, and 200 pulse signals were applied, so as to prepare a graphene/nickel-cobalt hydroxide composite electrode material (abbreviated "composite electrode material of Example 1" hereinafter). In Example 1, the graphene layer has a thickness of about 10 nm to 100 nm, and the nickel-cobalt hydroxide layer has a thickness of about 10 nm to 100 nm.

Figure 3:
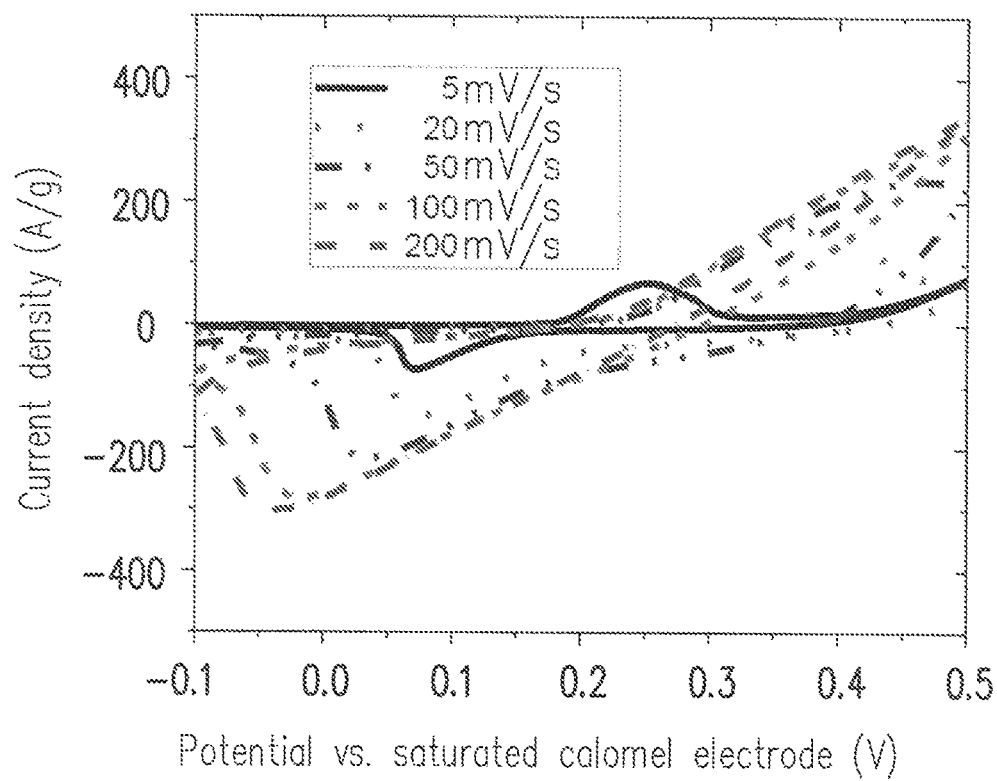
FIG. 3 is a cyclic voltammetry curve of the composite electrode material of Example 1.
Figure 4:
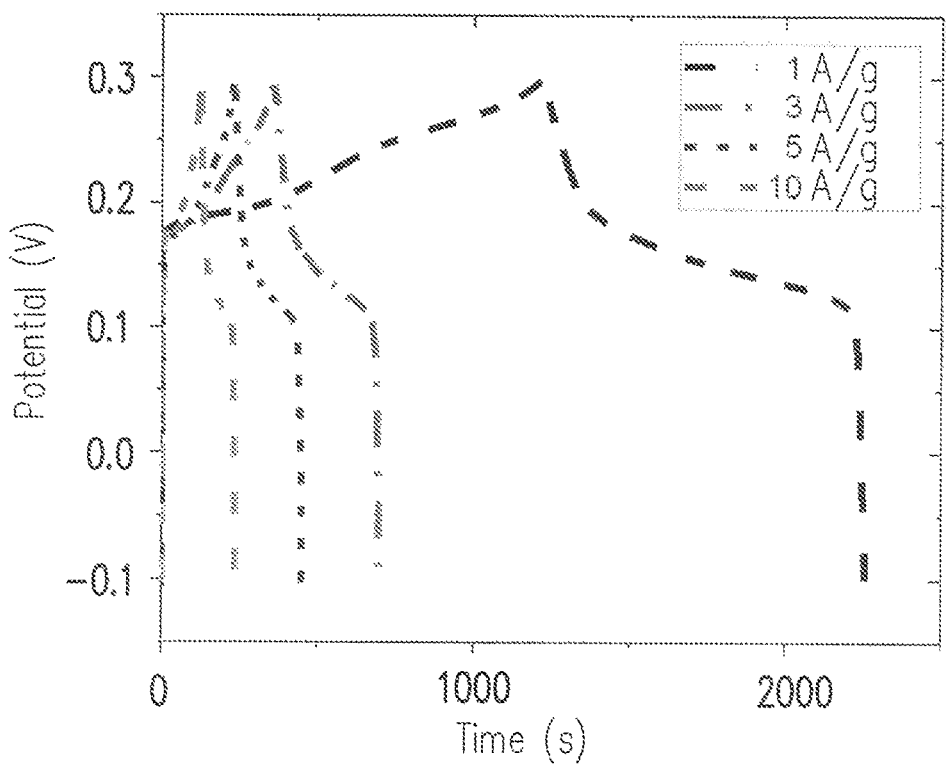
FIG. 4 is a resulting curve of a charging/discharging test of the composite electrode material of Example 1.
Figure 5:
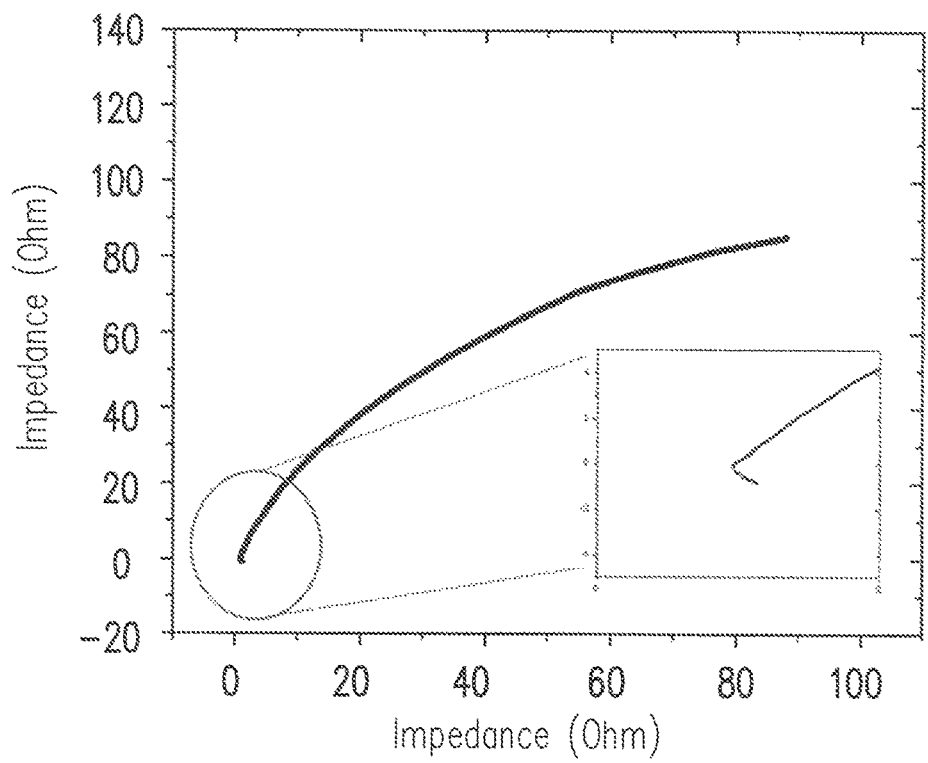
FIG. 5 is resulting curve of an AC impedance of the composite electrode material of Example 1.

Afterwards, the composite electrode material of Example 1 was placed in a vacuum oven to remove water, the electrochemical properties thereof were measured with a potentiostat (CH Instruments, CHI 608), and the results were shown in FIG. 3, FIG. 4 and FIG. 5.

FIG. 3 is a cyclic voltammetry curve of the composite electrode material of Example 1. FIG. 4 is a resulting curve of a charging/discharging test of the composite electrode material of Example 1. FIG. 5 is resulting curve of an AC impedance of the composite electrode material of Example 1.

As shown in FIG. 3, the composite electrode material of Example 1 has a reversible oxidation and reduction property. The composite electrode material of Example 1 has an oxidation peak potential of about 0.25 V and a reduction peak potential of about 0.075 V at a scan rate of 5 mV/s. That is, the composite electrode material of Example 1 is formed with a charging/discharging property.

Afterwards, a charging/discharging test is performed to the composite electrode material of Example 1 in a constant current mode, and the results are shown in FIG. 4. The composite electrode material of Example 1 has a charging time of about 2,300 seconds at a current density of 1 A/g, and has a charging time of about 235 seconds at a current density of 10 A/g. That is, the charging time of the composite electrode material of Example 1 can be quickly shortened at a high current density. When such composite electrode material is applied to an energy storage device, the energy storage device can be charged more quickly than a conventional energy storage device, either in a constant current mode or under the case of charging the same capacitance. Specifically, since no conductive layer or merely single conductive layer is included in the conventional energy storage device, an issue which electrons cannot be transmitted rapidly at a high current density is generated. Based on the above, the issue of the conventional energy storage device can be resolved by the present invention.

As shown in FIG. 5, when the composite electrode material of Example 1 is applied to an energy storage device, the composite electrode material of Example 1 has a smaller internal resistance of about zero Ohms. That is, the composite electrode material of Example 1 is formed without excessive impedance leading to a reduction in charging/discharging performance.

In addition, the specific capacitance of the composite electrode material of Example 1 can be calculated from the data from FIGS. 3-5 and the following equation.

$$C = \frac{I \times \Delta t}{\Delta V \times m} \quad (1)$$

wherein I is the current density, $\Delta t$ is the charging/discharging time, m is the mass of the sample, and $\Delta V$ is the working voltage.

Figures 6A, 6B:
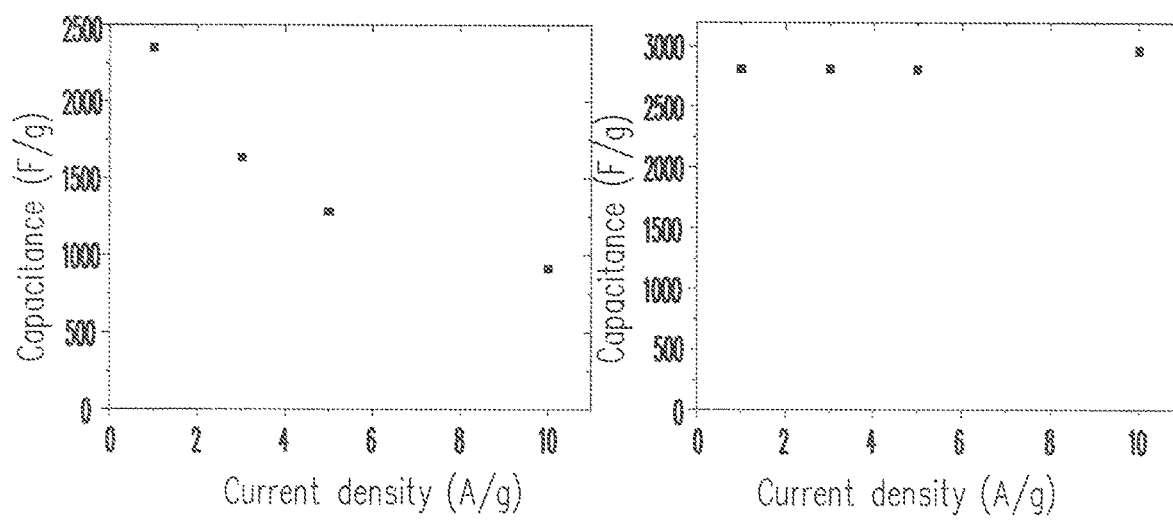
FIG. 6A is a graph showing the relationship between the current density and the specific capacitance of a conventional electrode material.
FIG. 6B is a graph showing the relationship between the current density and the specific capacitance of the composite electrode material of Example 1.

FIG. 6B is a graph showing the relationship between the current density and the specific capacitance of the composite electrode material of Example 1 calculated from the above equation. FIG. 6A is a graph showing the relationship between the current density and the specific capacitance of a conventional electrode material. The so-called conventional electrode material indicates a single nickel-cobalt hydroxide layer coated on the electrode.

Referring to FIG. 6A and FIG. 6B, the specific capacitances (about 2,800-3,000 F/g) of the composite electrode material of Example 1 at different current densities (i.e., 1, 3, 5, 10 A/g) are all higher than the specific capacitance (about 1,000-2,300 F/g) of the conventional electrode material. On the other hand, the composite electrode material of Example 1 still has a high specific capacitance of about 2800-3,000 F/g at a high current density of 10 A/g. On the contrary, the specific capacitance of the conventional electrode material is reduced to 1,000 F/g at a high current density of 10 A/g. That is, the composite electrode material of the present invention can effectively solve the issue of rapid decline in specific capacitance at a high current density.

Therefore, the present invention can solve the issue of long charging time of the conventional energy storage device. The energy storage device including the composite electrode material of the invention can be provided with a shorter charging time and thus drawn attention from consumers in terms of a commercial product. For example, the energy storage device is beneficial for a green energy field. When such energy storage device is applied to an electric vehicle, the fossil energy consumption and therefore the carbon emissions can be reduced, and the greenhouse effect can be alleviated.

In summary, in the present embodiment, a composite electrode material is formed on the surface of an auxiliary electrode by applying an alternating voltage to an electrodeposition device. The conductive material layers and the active material layers of the composite electrode material are stacked alternately along the direction non-parallel to the surface of the electrode, and are arranged disorderly along the direction parallel to the surface of the electrode. By such manner, the bonding properties between the conductive material layers and the active material layers can be improved, and the conductive material layers and the active material layers can be sufficiently mixed. Accordingly, the energy storage device including the composite electrode material of the present embodiment can maintain a high specific capacitance at a high current density charging/discharging. That is, the energy storage device including the composite electrode material of the present embodiment can significantly reduce the charging time so as to meet the users' requirements.

Besides, in the manufacturing method of the present embodiment, a stacked composite electrode material can be formed merely with a one-step method. Therefore, the performance of simplifying the process and reducing the cost can be easily achieved with the manufacturing method of the present embodiment.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A composite electrode material, disposed on a surface of an electrode of an electrochemical energy storage device and comprising:

a plurality of conductive material layers, wherein each of the conductive material layers has a thickness of 0.3 nm to 100 nm; and a plurality of active material layers, wherein the conductive material layers and the active material layers are stacked alternately along a direction non-parallel to the surface of the electrode, and are arranged disorderly along a direction parallel to the surface of the electrode, each of the active material layers has a thickness of 0.3 nm to 100 nm, a number of the conductive material layers is N or N+1, a number of the active material layers is N, and N is an integer equal to or greater than 2, so that the conductive material layers and the active material layers are sufficiently mixed, thereby maintaining a high specific capacitance of the electrochemical energy storage device at a high current density charging/discharging.

2. The composite electrode material of claim 1, wherein a material of the conductive material layers comprises a graphene, a graphene derivative, carbon nanotubes, a monomer for a conductive polymer or a combination thereof.

3. The composite electrode material of claim 1, wherein a material of the active material layers comprises a positive electrode active material or a negative electrode active material.

4. The composite electrode material of claim 1, wherein a material of the active material layers comprises a metal oxide, a metal hydroxide, a metal oxysulfide, a metal sulfide, a metal fluoride, a metal or a combination thereof.

5. A composite electrode material, disposed on a surface of an electrode of an electrochemical energy storage device and comprising:
a plurality of first stacked structures, disposed on the surface of the electrode, wherein each of the first stacked structures has a plurality of first conductive material layers and a plurality of first active material layers stacked alternately along a direction non-parallel to the surface of the electrode, wherein one of the first conductive material layer is in contact with the surface of the electrode, each of the first conductive material layers has a thickness of 0.3 nm to 100 nm, each of the first active material layers has a thickness of 0.3 nm to 100 nm, a number of the first conductive material layers is N or N+1, a number of the first active material layers is N, and N is an integer equal to or greater than 2; and
a plurality of second stacked structures, disposed on the surface of the electrode, wherein each of the second stacked structures has a plurality of second conductive material layers and a plurality of second active material layers stacked alternately along the direction non-parallel to the surface of the electrode, wherein one of the second active material layer is in contact with the surface of the electrode, each of the second conductive material layers has a thickness of 0.3 nm to 100 nm, each of the second active material layers has a thickness of 0.3 nm to 100 nm, a number of the second active material layers is i or i+1, a number of the second conductive material layers is i, and i is an integer equal to or greater than 2,
wherein the first stacked structures and the second stacked structures are arranged disorderly along a direction parallel to the surface of the electrode, so that the first stacked structures and the second stacked structures are sufficiently mixed, thereby maintaining a high specific capacitance of the electrochemical energy storage device at a high current density charging/discharging.

6. The composite electrode material of claim 5, wherein a material of the first conductive material layers and the second conductive material layers comprises a graphene, a graphene derivative, carbon nanotubes, a monomer for a conductive polymer or a combination thereof.

7. The composite electrode material of claim 5, wherein a material of the first active material layers and the second active material layers comprises a positive active material or a negative active material.

8. The composite electrode material of claim 5, wherein a material of the first active material layers and the second active material layers comprises a metal oxide, a metal hydroxide, a metal oxysulfide, a metal sulfide, a metal fluoride, a metal or a combination thereof.

9. The composite electrode material of claim 1, wherein the conductive material layers and the active material layers are both included at a same level perpendicular to the top surface of the electrode.

\* \* \* \* \*